Feb. 11, 1947.  C. M. HINES  2,415,492
LINEAR SPEED INDICATOR
Filed Feb. 26, 1943

INVENTOR
Claude M Hines
BY
ATTORNEY

Patented Feb. 11, 1947

2,415,492

UNITED STATES PATENT OFFICE 2,415,492

LINEAR SPEED INDICATOR

Claude M. Hines, Pittsburgh, Pa., assignor to The Westinghouse Air Brake Company, Wilmerding, Pa., a corporation of Pennsylvania Application February 26, 1943, Serial No. 477,315

1 Claim. (Cl. 175—183)

This invention relates to speed indicators, and more particularly to a linear speed indicator for measuring the feed of a machine tool or the like.

An important factor in the control of industrial production is the accuracy of available information as to the capacity of individual machine tools, useful to an industrial engineer engaged in preparation of a machine tool analysis. To determine the productive rate of a machine tool, such as a boring mill, the industrial engineer should have means for adequately checking the feed of the machine, or the speed of movement of the work table toward the boring unit, in the case of the machine mentioned. The feed of such a machine may approach a rate as low as one inch per minute, however, and it has heretofore been considered impracticable to attempt the construction of a commercial instrument operative to indicate so slow a linear speed. At least it appears that there is no indicator now available which will accurately register speeds in the desired range.

It is an object of my invention to provide an accurate linear speed indicator of simple and inexpensive construction, which may be employed in directly reading the rate of travel or feed of moving elements on boring mills, lathes, and other machine tools.

Another object of my invention is to provide an indicator device of the above type which is operated electrically, and which may comprise relatively few elements occupying small space.

A further object of the invention is to provide a linear speed indicator, the elements of which may be assembled as a permanent fixture in a certain machine tool, or may if preferred be housed in a portable box for occasional use in connection with any one of a number of machine tools.

Figure 1:
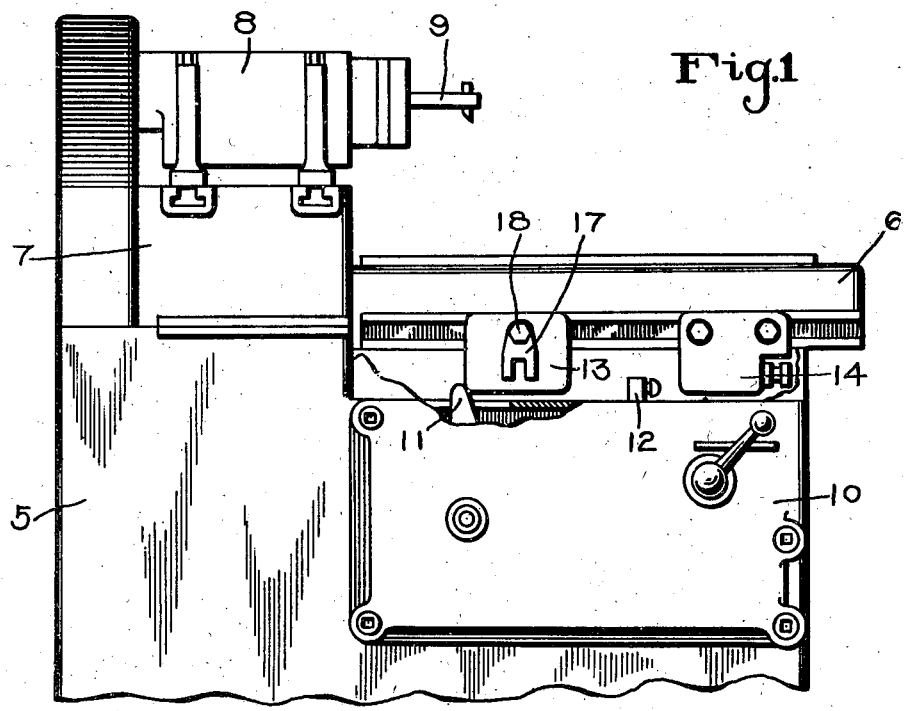
Figure 2:
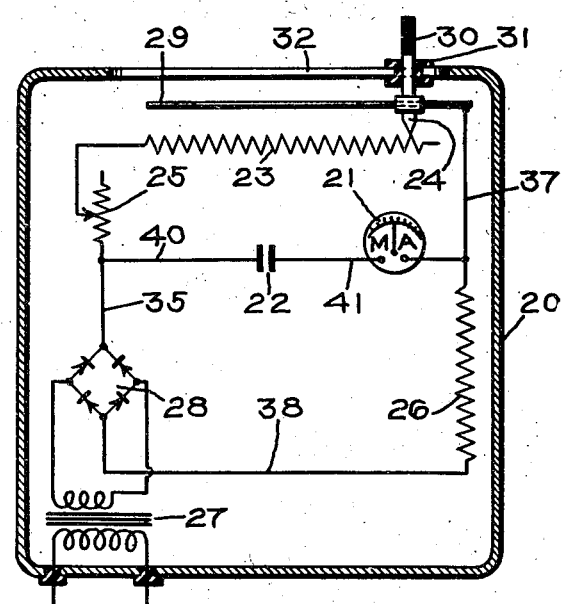

Other objects and advantages of the invention will appear in the following more detailed description thereof, taken in connection with the accompanying drawing, wherein Fig. 1 is an elevational view of a typical boring machine with which my linear speed indicator may be employed; and Fig. 2 is a diagrammatic view of a linear speed indicator constructed in accordance with the invention.

The boring machine shown in Fig. 1 is illustrative of one class of machine tools of the slow feed type with which my linear speed indicator is particularly useful, it being understood that the machine as such does not form any part of the invention. This boring machine consists of a base structure 5 adapted to contain suitable hydraulic or mechanical means for moving a table 6, which is slidably mounted on the base structure, a boring head bridge 7, and a boring head unit 8 adjustably mounted on the bridge for supporting a motor driven tool 9. A control box 10 is mounted on the base 5 and encloses suitable controlling elements including a speed reduction lever 11 and a stop lever 12, which are arranged to be actuated by a pair of adjustable cam members 13 and 14 bolted to the movable table 6. In order that the feed or linear speed of the table 6 may be readily measured by means of my indicator, about to be described, a U-shaped lug 17 is preferably secured by means of a bolt 18 to the cam member 13.

In Fig. 2 of the drawing there is illustrated a preferred form of linear speed indicator embodying my invention, it being understood that the assembled elements are shown diagrammatically. The apparatus includes a casing structure 20 of a suitable design for housing a milliammeter 21 having a conveniently located dial, a condenser 22, a variable resistor 23 having a slidable contact element 24, auxiliary circuit resistors 25 and 26, and a battery or other source of direct current, such as a transformer 27 and copper-oxide rectifier assembly 28. The slidable contact element 24 bridges the resistor 23 and a contact rod 29, and terminates in an operating stud 30, which extends outwardly through an insulator block 31 adapted to ride in a slot 32 formed in the casing. The stud 30 is of a size rendering it suitable for engagement with the U-shaped lug 17 on the machine shown in Fig. 1.

According to the invention, the condenser 22 and variable resistor 23 are arranged in parallel in a circuit energized from the power source, so that when the variable resistor is operated at the speed or feed of the associated machine tool, the resultant change in potential will cause a proportionate flow of current locally in the condenser circuit, which will be indicated by the milliammeter 21. In responding to the current at the condenser, the milliammeter 21 thus will reflect the rate of feed of the machine tool, and with the dial calibrated in inches per minute, a direct reading thereof will yield the exact feed in all phases of traverse of the moving element of the machine, without interruption of normal operation.

Referring again to Fig. 2 of the drawing, electrical energy introduced by way of the transformer 27 is supplied at a reduced voltage by the copper-oxide rectifier assembly 28 to a circuit including a conductor 35, the resistor 25, which is preferably of the adjustable type, the variable resistor 23, slidable contact element 24, rod 29, a conductor 37, the fixed resistor 26, and a return conductor 38 leading back to the rectifier assembly. When the device is initially energized, a current will also flow by way of the conductor 35 through a branch conductor 40 to charge the condenser 22 at the existing potential, thence flowing by way of a conductor 41 and through the milliammeter 21 to the conductor 37, resistor 26, and return conductor 38.

The apparatus is then ready for use, and the stud 30 may be inserted in the opening in the lug 17 carried by the table 6 of the machine tool shown in Fig. 1, while the casing 20 may be supported either in the hands of the operator or on a suitable support associated with the apparatus and not illustrated.

Assuming that the slidable contact element 24 is initially disposed in the maximum resistance position, as illustrated in Fig. 2, and that the condenser 22 has been charged so that the pointer of the milliammeter 21 has taken its neutral position, the machine tool, Fig. 1, may be set in operation, the table 6 thereof moving to the left and carrying with it the stud 30 and slidable contact element 24. As the slidable contact element 24 is thus operated to reduce the amount of resistance in the circuit, the corresponding gradual drop in potential across the resistor 23 results in the flow of a discharge current from the previously charged condenser 22, this local current passing from the condenser by way of the conductor 40, resistor 25, resistor 23, movable contact element 24, contact bar 29, conductor 37, the milliammeter 21, and conductor 41. The current thus fed back into the circuit from the condenser 22 is directly proportional to the rate of decrease in voltage effected by operation of the movable contact element 24, and is consequently a measure of the speed thereof and of the feed of the machine tool shown in Fig. 1. This local discharge current set up by the condenser 22 is reflected in the reading of the milliammeter 21, and with the dial of that instrument calibrated in inches per minute, the true speed of the table of the machine tool is thus directly indicated.

Although I do not intend to limit the scope of my invention in any way other than as specified in the claims hereinafter presented, it will of course be understood that the elements of the linear speed indicator shown in Fig. 2 of the drawing are adapted to be suitably proportioned, with respect to their electrical characteristics to provide an instrument operable in a chosen service. By way of example, one model of linear speed indicator embodying features of the invention as illustrated in Fig. 2, which has been successfully employed for registering machine tool feeds within a range of one to twenty-five inches per minute, comprises a condenser 22 of the electrolytic type having a capacity of one thousand microfarads, a fixed resistor 26 of five ohms, a variable resistor 23 having a maximum value of ten ohms and an adjustable resistor 25 of one ohm, in connection with a direct current power supply amounting to six volts, under which condition a maximum potential drop of one volt across the variable resistor 23 has been obtained. It should be understood that the voltage drop of one volt, which is low in comparison with that derived by calculation in accordance with Ohm's Law, results from the use of the condenser 22 which, being of the electrolytic type, has an inherently high rate of leakage. The resistor 25 may have a maximum value of about one ohm and is preferably made in an adjustable form, in order to permit initial setting of the indicator with maximum accuracy.

Use of a speed indicator embodying my invention is not limited to the operation of the variable resistor 23 to reduce potential for causing the discharge of current from the condenser 22. It will be evident that if the operation of the slidable element 24 is reversed, so that the resistor is operated to increase an initially low voltage drop at the terminals thereof, the resultant local flow of current charging the condenser 22 will cause movement of the pointer of the milliammeter 21 in a corresponding direction for indicating the rate at which such increase in potential, readable in terms of the speed as already explained, is effected.

Having now described my invention, what I claim as new and desire to secure by Letters Patent is:

In a portable instrument for measuring the feed of a machine tool having an operating part traversing a linear path, the combination of a casing having an opening, electrical means in said casing for supplying direct current, a variable resistor mounted in said casing adjacent said opening and connected with said electrical means in an always closed circuit, a slidable contact element movable through a straight path to vary the amount of said resistor connected in said circuit, said contact element having an operating portion extending outwardly through said opening for engagement with said operating part of the machine tool, a condenser mounted in said casing and connected across said variable resistor, and a milliammeter carried by said casing and connected to register charging or discharging current flowing through said condenser for thereby indicating the linear speed of said operating part of the machine tool.

CLAUDE M. HINES.

REFERENCES CITED

The following references are of record in the file of this patent:

UNITED STATES PATENTS

| Number | Name | Date |
|---|---|---|
| 1,228,392 | Beighlee | June 5, 1917 |
| 1,665,857 | Needham | Apr. 10, 1928 |
| 1,709,674 | Kuhl | Apr. 16, 1929 |
| 2,108,014 | Jones | Feb. 8, 1938 |
| 1,946,926 | Barton | Feb. 13, 1934 |
| 2,332,773 | Barnette, et al. | Oct. 26, 1943 |
| 2,329,762 | Borst, et al. | Sept. 21, 1943 |

OTHER REFERENCES

Kronenberger, A. P. C. Pub., S. N. 367,329, May 25, 1943, 175–183–S ux.